United States Patent [19]
Horton

[11] 3,710,628
[45] Jan. 16, 1973

[54] PORTABLE AUTOMATIC PIPE TESTING MACHINE

[76] Inventor: Herbert D. Horton, Box 6434, Odessa, Tex. 79760

[22] Filed: May 25, 1971

[21] Appl. No.: 146,637

[52] U.S. Cl. ............................................... 73/49.5
[51] Int. Cl. .............................................. G01m 3/04
[58] Field of Search ........................... 73/49.1, 49.5

[56] References Cited

UNITED STATES PATENTS

| | | | |
|---|---|---|---|
| 2,017,393 | 10/1935 | Boax et al. | 73/49.5 X |
| 3,179,127 | 4/1965 | Terry | 73/49.1 X |
| 3,095,729 | 7/1963 | McConnell | 73/49.5 X |
| 2,947,165 | 8/1960 | Kirchner et al. | 73/49.5 X |

*Primary Examiner*—Donald O. Woodiel
*Attorney*—Marcus L. Bates

[57] ABSTRACT

A portable automatic pipe testing machine comprising a longitudinally disposed main frame having pipe engaging spaced apart arms attached thereto. Each arm has a claw located at one extremity thereof and the remaining end portion of each arm is pivotally attached to the frame. Spaced apart rotating heads are adapted to move towards and away from each other, longitudinally of the frame, to permit engagement with the terminal ends of the longitudinally disposed pipe which is to be tested. A source of pressurized fluid is adapted to flow into and out of at least one of the heads so as to hydrostatically test the interior of the pipe.

The arms are arranged with respect to spaced apart pipe racks so as to enable the claw to be moved by the arm in a manner to engage a pipe on one rack, and to transfer the pipe into a location respective to the machine which enables each of the heads to be attached thereto. After the pipe has been tested, the heads are unfastened from the terminal ends of the pipe, and the claw then releases the pipe, where it moves by gravity onto the other pipe rack.

7 Claims, 11 Drawing Figures

PATENTED JAN 16 1973
3,710,628
SHEET 1 OF 2
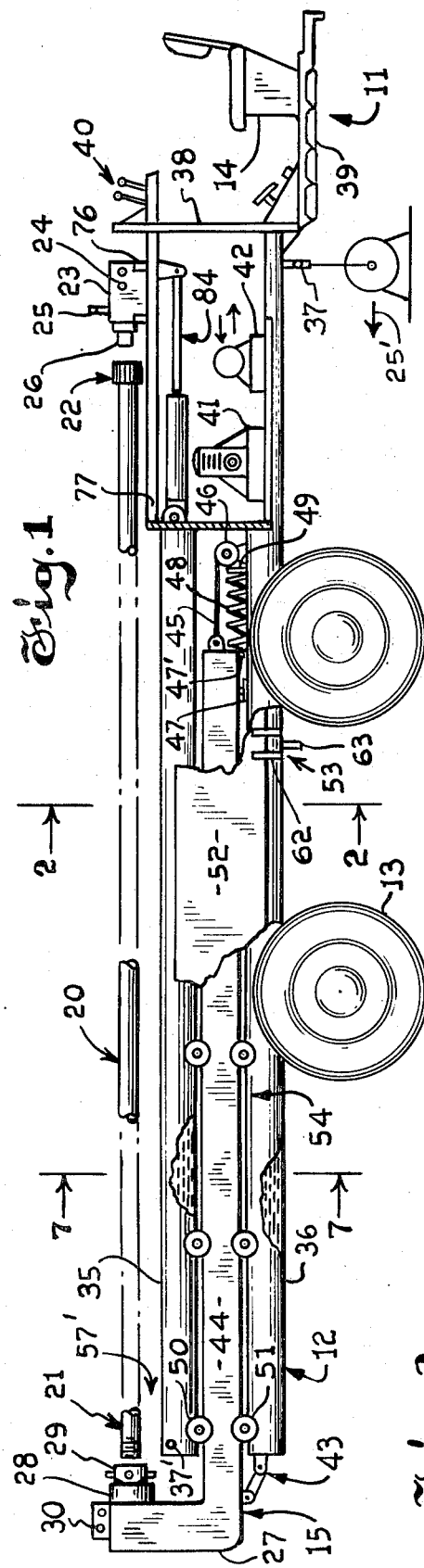
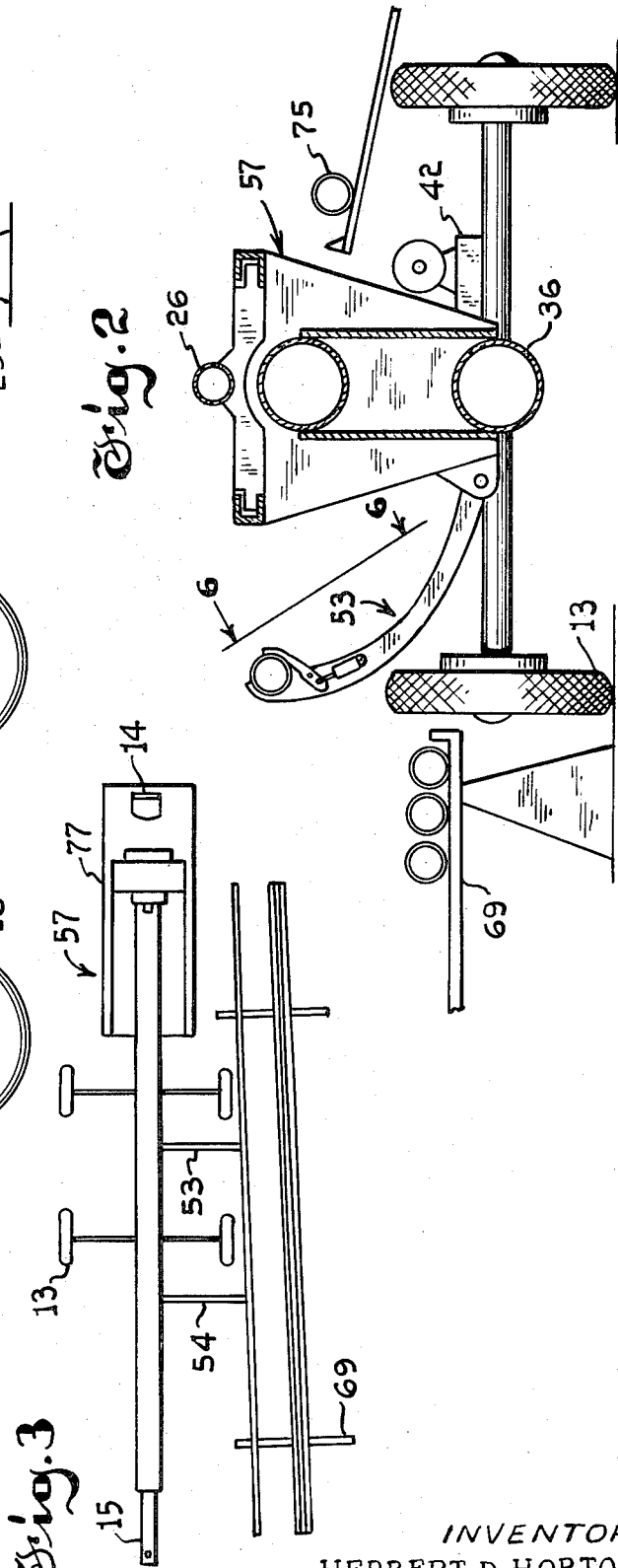
INVENTOR
HERBERT D. HORTON
BY  MARCUS L. BATES
HIS AGENT

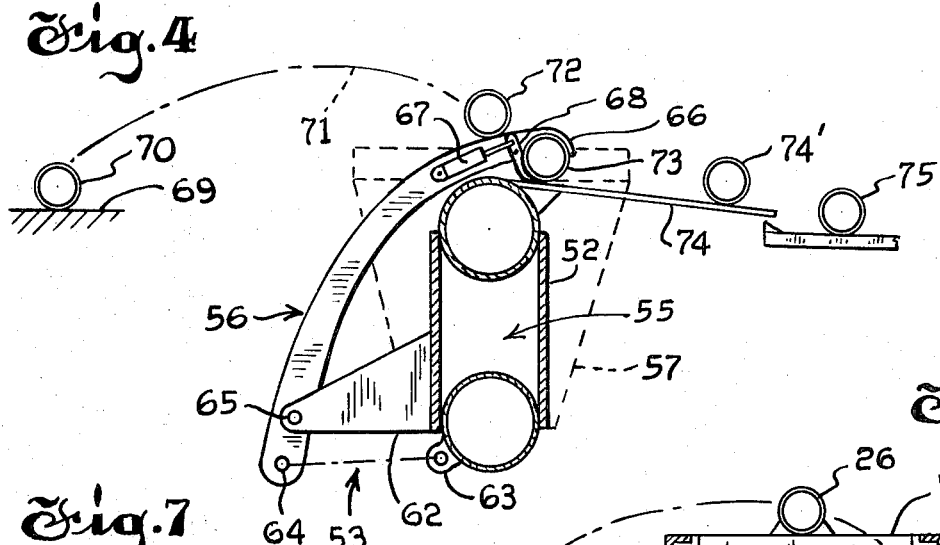
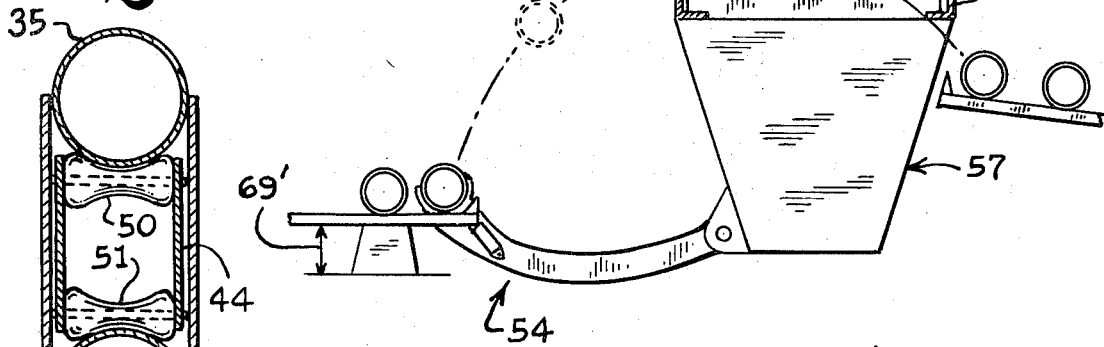
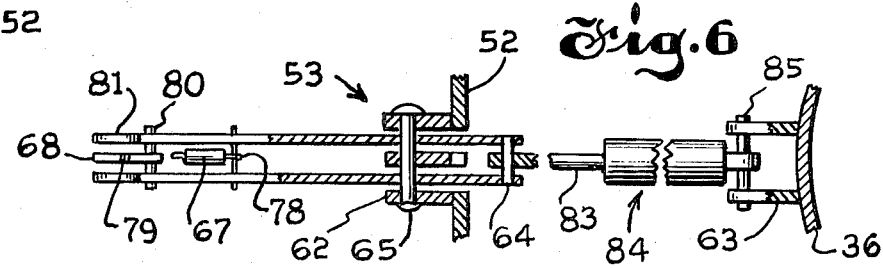
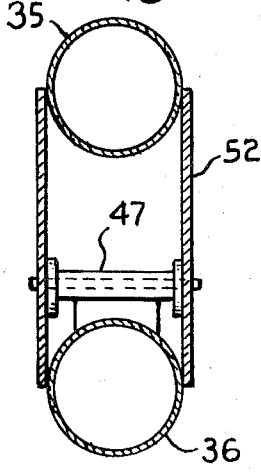
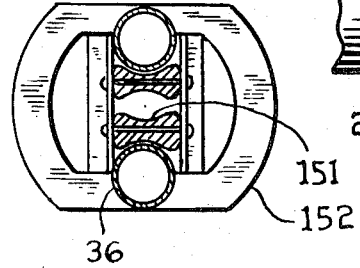
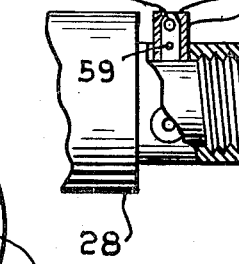
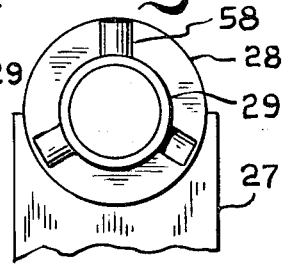
INVENTOR
HERBERT D. HORTON
BY MARCUS L. BATES
HIS AGENT

PORTABLE AUTOMATIC PIPE TESTING MACHINE

BACKGROUND OF THE INVENTION

Throughout this disclosure, the term "pipe" relates to tubular goods including drill pipe, production pipe, and various other metallic and non-metallic pipe and piping utilized to transfer fluids from one location to another. Generally, the pipe to be tested is threaded at each end to enable it to be attached in series relationship to one another by means of a coupling, or the pipe may be of the type which can be connected together by a box and pin, whereby they may be directly connected in series relationship to one another.

The term "water" is intended to relate to any non-compressible fluid suitable or carrying out hydrostatic testing of pipe.

Throughout the oil industry, and especially in the field of oil production, it is necessary from time to time to remove pipe from a specific duty for one reason or another. For example, when replacing downhole equipment associated with a producing well, it is usually necessary to pull several thousand feet of production pipe from the borehole.

Once pipe has been used downhole in a borehole, the structural integrity of the individual joints is questionable and accordingly, there are many who are reluctant to reuse the pipe, although the vast majority of the joints of used pipe may be perfectly suitable for continued use. Accordingly, the pipe is subjected to pressure testing to assure that it is structurally sound and economically feasible for reuse, for otherwise one or more joints of pipe may fail after it has been reinstalled, thereby causing the entire pipe string to be prematurely removed from the borehole.

Accordingly, it is desirable to have apparatus for automatically testing both used and new pipe. It is desirable that such an apparatus have the capability of being operated by a single workman so as to reduce the hazards of handling heavy pipe as well as the cost of the testing. Moreover, it is desirable that the workman be able to test the pipe by using the apparatus in a manner which never requires him to physically handle the pipe.

SUMMARY OF THE INVENTION

This invention teaches those skilled in the art to fabricate apparatus for testing pipe, wherein the apparatus picks up joints of pipe from one pipe rack, transfers the pipe to be tested into operative relationship therewith, subjects the pipe to a predetermined hydrostatic pressure to determine its structural integrity, and thereafter deposits the tested pipe onto another pipe rack which is spaced apart from the pipe rack containing the untested pipe.

The apparatus comprises a longitudinally extending main frame having spaced apart laterally disposed arms for engaging and supporting the pipe, with the arms having a pipe engaging end and a pivotal end, with the pivotal end being attached to the frame. The apparatus further includes claw means attached to the free end of the arm for engaging and disengaging the pipe.

Spaced apart rotating heads are movable towards and away from each other, and are movably affixed to the apparatus so that the arms may bring a pipe to be tested into proximity of the heads, whereupon the heads are moved into fluid tight engagement with the pipe, and thereafter flow is conducted from a source of pressurized fluid, through one of the heads, and into the pipe.

After the pipe has been subjected to the hydrostatic test, the heads are automatically unfastened from the pipe, and the pipe is disengaged from the claws on the terminal end of the arm, whereupon the pipe then rolls onto the remaining pipe rack.

Therefore, a primary object of this invention is the provision of apparatus for automatically testing pipe which can transport pipe from one pipe rack into operative engagement with the testing apparatus and after the pipe has been tested it is automatically racked at another location which is removed from the original pipe rack.

Another object of the present invention is to provide improved apparatus for testing pipe which eliminates the necessity of a workman physically contacting the tubular goods.

A further object is to provide means by which pipe can be transported from a pipe rack into a testing position, and thereafter further transported to another pipe rack.

A still further object of the present invention is to provide improvements in apparatus for automatically handling and testing pipe.

Another object of the present invention is to provide improvements in pipe testing by the provision of a flow system for hydrostatically testing the pipe.

Various other objects and advantages of this invention will become readily apparent to those skilled in the art upon reading the following detailed description and claims and by referring to the accompanying drawings.

The above objects are attained in accordance with the present invention by the provision of a combination of elements which are fabricated in a manner substantially as described in the above abstract and summary.

BRIEF DESCRIPTION OF THE DRAWINGS

FIG. 1 sets forth a side elevational, partly broken, partly cross-sectional view of a pipe testing machine made in accordance with the present invention;

FIG. 2 is a cross-sectional view of the apparatus taken along line 2—2 of FIG. 1;

FIG. 3 is a schematical representation which sets forth a top plan view of one of the embodiments of the present invention;

FIG. 4 is an enlarged, part cross-sectional, part diagrammatical representation of the invention;

FIG. 5 is similar to FIG. 4 and shows the apparatus in a different operative configuration;

FIG. 6 is an enlarged, part cross-sectional view taken longitudinally of one arm as indicated by the line 6—6 of FIG. 2;

FIG. 7 is an enlarged, part cross-sectional view taken along lines 7—7 of FIG. 1;

FIG. 8 is a reduced cross-sectional view which sets forth a modification of FIG. 7;

FIG. 9 is an enlarged, fragmentary, part cross-sectional representation of part of the apparatus disclosed in FIG. 1;

FIG. 10 is an end view of the apparatus seen in FIG. 9; and,

FIG. 11 is an end view, similar to FIGS. 7 and 8, which sets forth a modification of the invention.

DETAILED DESCRIPTION OF THE PREFERRED EMBODIMENTS

As seen in the drawings, and in particular, FIG. 1, the arrow at numeral 11 generally indicates a portable automatic pipe testing apparatus made in accordance with the present invention. The apparatus is seen to include a longitudinally disposed main frame 12 which is sprung from a plurality of wheels 13 having pneumatic tires mounted thereon in the usual manner. The apparatus could be skid mounted, if preferred.

Numeral 14 indicates the forward end of the apparatus, which has the illustrated facilities associated therewith for attachment to the drawbar or trailer hitch of a conventional prime mover, such as a truck, for example. The rearward end of the apparatus is generally indicated by the arrow at numeral 15. A longitudinally extending pipe 20 is being tested by the apparatus, and as seen in FIG. 1, the pipe has the usual depending end portions 21 and 22 which may take on several different forms, as for example, end 21 is the pin while end 22 is the box, or vice versa, if desired.

Hydraulic motor 23 is a high torque, low speed device and has the usual pressure and suction attachments 24 associated therewith so as to provide power fluid for causing the motor to rotate. Inlet 25 is adapted to be connected to a source of non-compressible fluid, such as water. A rotating head 26 is controllably rotated in either a clockwise or counterclockwise direction, depending upon the direction of controlled fluid flow at 24. The head sealingly communicates with conduit 25 so as to enable water to be forced through the head and into the pipe 20. The head is adapted to threadedly engage the threaded end of the pipe to be tested.

Upstanding member 27, hereinafter called a "stanchion", provides a support means for a second hydraulic motor 28, which is similar in operation to the previously disclosed motor. Rotating head 29 is similar to the one disclosed at 26, except for the absence of a source of water, and for the additional provision of check valve means, as will be discussed in greater detail later on. Hydraulic flow conduits at 30 provide power fluid for the hydraulic motor, with conduits 30 being connected to the same source of power fluid as is the before described motor.

A tubular frame member 35 is preferably in the form of an elongated longitudinally disposed flow conduit, and is identical in size to the lower tubular frame member 36. Water outlet 37 communicates with the interior of both tubular frame members and with the illustrated pump so as to provide a source of water under high pressure for carrying out hydrostatic testing of the tubular goods. A load carrying vertical bulkhead 38 is attached to the terminal ends of each of the tubular frame members and to the built up platform 39, with the platform also forming a portion of the before mentioned trailer hitch. A plurality of controls, generally indicated by the arrow at numeral 40 can take on several different known forms so long as it is flow connected to enable positive control over all of the various hydraulic motors and cylinders associated with the apparatus by utilizing conventional hydraulic control flow circuitry.

Internal combustion engine 41 drives hydraulic pump assembly 42 so as to provide a common source of hydraulic fluid in the usual manner.

At the rearward end of the apparatus there is disposed a fastener means 43 in the form of a link which is pinned to the telescoping box spear 44 and to the rear terminal end of the lower tubular frame member so as to rigidly anchor one member to the other when transporting the device along the highway.

Cable 45 is attached to the forward end of the box spar and to the hydraulically actuated winch 46. Vertical bulkhead 49 has the lower edge portion thereof welded to the lower tubular frame member. Vertically disposed stop member 47' is a continuation of the rear wall of spar 44 and moves therewith. Coil spring 48 is compressed between bulkheads 47' and 49 and is of a sufficient size to cause movement of the box spar relative to the main frame. Stop means 47 is adjustably and movably affixed to the lower tubular frame member and is positioned so as to abut member 47' when one is moved into contact with the other.

As seen in FIGS. 1 and 7, a plurality of spaced apart trucks 50, 51 are journaled to the vertically disposed, parallel, spaced apart plates which form the box spar with the trucks bearing against the upper and lower tubular frame members in low friction relationship so as to enable the spar to be telescopingly received within the main frame. The box spar is therefore telescopingly captured by the spaced apart main tie plates 52 which is welded to each of the frame members.

The arrows at numerals 53 and 54 indicate spaced apart pipe lifting stations, and as seen in FIGS. 4, 5, and 6, each of the stations include a pipe lifting arm.

Looking now to the details of the rear rotating head assembly, and in particular to FIGS. 9 and 10, the head is seen to be provided with three spaced apart check valve assemblies 58, within which there is disposed a cage 59 which retains ball 60 loosely captured therewithin and below seat 61. The check valves are preferably spaced 120° apart relative to one another, so that one ball check valve is always upwardly directed.

Looking again now to FIGS. 4–6, the before mentioned arm is seen to be pivotally attached to ears 62, while ear 63, together with the extended portion of the arm at 64, provides a means by which the arm can be actuated in an arcuate manner as it pivots about pin 65. The free end of the arm terminates as a claw 66. Hydraulic cylinder 67 actuates movable finger 68 so as to enable the claw to grasp a pipe in high friction relationship therewith.

Numeral 69 indicates a pipe rack having untested pipe 70 disposed thereon in the usual manner. The path of the pipe as it is moved into its test position at 72 is indicated by numeral 71. The pipe is released at 73 where it is guided at 74 onto the pipe rack at 75, which receives the tested pipe. As best seen in FIGS. 1, 2, and 5, the front rotating head along with its motor is disposed on a platform 76 which is slidably captured by the U-shaped channel 77 so as to enable the entire assembly to be moved longitudinally within the channel and between the illustrated bulkheads of the V-shaped tank.

Each of the arms are also tied together by pin member 78 to which the before mentioned hydraulic cylinder 67 is pivotally attached. The piston is pinned to the movable finger at 79 and pivoted by means of pin 80 which maintains the free end of the elements of the arm properly spaced apart with respect to one another.

The fixed finger 81 of the claw is preferably arranged in the illustrated manner of FIG. 4 so that when the movable finger is actuated to the released position by the cylinder 67, the pipe can freely fall onto the pipe guide.

In operation, the apparatus 11 is positioned adjacent to and inbetween spaced apart pipe racks. The hydraulic pump and water pump means are energized so as to provide a source of power fluid and water pressure. Controls 40 are manipulated so as to cause the arms at stations 53 and 54 to move in a downward direction past the pipe 70 located on the pipe rack 69. The pipe rolls away from and back against its stop while the claw moves downwardly past and back upwardly into engagement with the claw, whereupon the claw grasps the pipe as the arm moves it into position 73.

Winch 46 and cylinder assembly 84 are energized to cause the rotating heads to move towards one another and into engagement with the pipe whereupon the heads threadedly make-up to the pin and box of the pipe to be tested, and hydrostatic pressure is imposed upon the interior of the pipe. As water flows from the water pump, through inlet 25, through head 26 and into the pipe, at the same time air is displaced through the uppermost check valve 58.

As water strikes the ball located within the uppermost check-valve, the ball is forced against seat 61, and accordingly, at this time, all of the compressible fluid has been forced from the interior of the pipe to be tested, while only a trifle of water has been expelled therefrom.

The hydrostatic pressure is increased to a predetermined value which is naturally maintained below the normal breaking strength of the pipe. The pressure is held for a suitable length of time to assure that no leakage is occurring, as evidenced by isolating the pipe undergoing the test from the pressure source and observing the rate of decay on a conventional pressure indicator.

After the test is completed, and with the claws still firmly holding the pipe in a vice-like grip, the heads are rotated counterclockwise relative to each other and in a direction to release the terminal threaded ends of the pipe from the spaced apart heads. It is preferred that end 22 of the pipe be downwardly disposed relative to end 21 so as to enable fluid therefrom to be captured by the illustrated hopper-like tank 57. As soon as the pipe ends have been broken loose from the heads, the movable finger of the claw is actuated by its hydraulic cylinder means, and the pipe accordingly is dropped onto the pipe guide means where gravity causes it to travel down the inclined slope onto the second pipe rack. If deemed desirable, the pipe can be moved into the illustrated position 73 of FIG. 4 so as to place it in close proximity of its guide and therefore avoid unduly jarring the tubular goods upon release of the pipe from the claws.

Hydraulic cylinder 84 is again actuated so as to return the arms into the illustrated position of FIG. 5, whereupon another pipe is picked up and moved into the test position 72 of FIG. 4.

Often the tubular goods will be of varying lengths and accordingly, stop member 47 must be positioned relative to member 47' so as to enable each of the heads to properly accommodate the various pipe joints. It is necessary for spring 48 to always move head 29 sufficiently far away from arm 54 so as to permit the pipe 20 to be received between the heads. Likewise, hydraulic cylinder 84 must move power assembly 23 sufficiently far enough towards bulkhead 38 to enable the various lengths of pipe to be received therebetween. Accordingly, since the claws hold the pipe in a vice-like grip, each pipe to be tested requires movement of both assembly 23 and 28. This expedient is best accomplished by actuating both drum 46 and hydraulic cylinder 84 in a manner to bring heads 26, 29 towards one another an simultaneously into engagement with the pin and box of the pipe, while at the same time causing the heads to be rotated and the threads therebetween made-up into proper engagement with the pipe.

Since the claws hold the pipe against rotation while the heads are being made-up and broke-out respective thereto, it is unnecessary to employ other tong-like devices in association with the testing procedure.

I claim:

1. Apparatus for testing pipe, comprising: a longitudinaLly extending main frame, spaced apart arms laterally arranged respective of said frame for engaging and supporting pipe, said arms having a pipe engaging end and a pivotal end, means by which said pivotal end is journaled to said main frame;

spaced apart heads for engaging the terminal ends of a pipe to be tested, a supply of non-compressible fluid, means for increasing the fluid pressure to a value which is less than the designed bursting strength of the pipe to be tested; means mounting said heads to said main frame, means for rotating one said head; flow conduit means for conducting flow from the supply of fluid to one head and into a pipe when the ends of a pipe are attached to the heads;

means for moving each head towards and away from one another so as to enable the heads to be engaged and disengaged from the ends of the pipe;

one said head includes a plurality of spaced apart check valve means attached thereto;

said check valve means being in communication with the head and the interior of a pipe when a pipe is attached to the head;

said check valve means including a valve seat, a valve element, said valve element adapted to be moved away from said seat by gravity and towards said seat by a non-compressible fluid, whereby, one check valve is always upwardly disposed so as to exhaust compressible fluid from the pipe.

2. The apparatus of claim 1, wherein said pipe engaging end of at least one of said arms includes a claw;

said claw having fixed fingers attached to said arm and movable fingers journaled to said arm, whereby:

the movable fingers of the claw can be moved towards the fixed finger and into engagement with the outer peripheral surface of the pipe so as to engage the pipe and enable it to be lifted into alignment with the spaced apart heads.

3. The improvement of claim 2 and further including means by which the pipe can be moved from said heads to another location respective thereto when the claw is released from the pipe.

4. The apparatus of claim 1, wherein said means for moving each head towards one another includes a telescoping member adapted to be received within said main frame, means for moving said telescoping member longitudinally of said main frame; one said head being affixed to a depending end of said telescoping member; and means slidably mounting the remaining said head to said main frame.

5. Apparatus for testing pipe, comprising: a longitudinally extending main frame, spaced apart arms laterally arranged respective of said frame for engaging and supporting pipe, said arms having a pipe engaging end and a pivotal end, means by which said pivotal end is journaled to said main frame;

spaced apart heads for engaging the terminal ends of a pipe to be tested, a supply of non-compressible fluid, means for increasing the fluid pressure to a value which is less than the designed bursting strength of the pipe to be tested; means mounting said heads to said main frame, means for rotating one said head; flow conduit means for conducting flow from the supply of fluid to one head and into a pipe when the ends of a pipe are attached to the heads;

means for moving each head towards and away from one another so as to enable the heads to be engaged and disengaged from the ends of the pipe;

said main frame includes a top, bottom, and side walls;

said means for moving each head towards each other includes one head being movably mounted to said main frame; and, a spar means to which the second one of said heads is attached; said spar means being telescopingly received within said main frame.

6. The apparatus of claim 5, wherein said pipe engaging end of at least one of said arms includes a claw;

said claw having fixed fingers attached to said arm and movable fingers journaled to said arm, whereby:

the movable fingers of the claw can be moved towards the fixed finger and into engagement with the outer peripheral surface of the pipe so as to engage the pipe and enable it to be lifted into alignment with the spaced apart heads.

7. The apparatus of claim 5, and further including means by which the pipe can be moved from said heads to another location respective thereto when the claw is released from the pipe.

* * * * *